US012644530B2

(12) United States Patent
Zhang et al.

(10) Patent No.: US 12,644,530 B2
(45) Date of Patent: Jun. 2, 2026

(54) FLUID CONTROL ASSEMBLY AND THERMAL MANAGEMENT SYSTEM

(71) Applicant: ZHEJIANG SANHUA AUTOMOTIVE COMPONENTS CO., LTD., Zhejiang (CN)

(72) Inventors: Rongrong Zhang, Hangzhou (CN); Haonan Cheng, Hangzhou (CN); Chunqiang Wu, Hangzhou (CN); Xiangyu Zhang, Hangzhou (CN); Yongxiang Tan, Hangzhou (CN)

(73) Assignee: ZHEJIANG SANHUA AUTOMOTIVE COMPONENTS CO., LTD., Hangzhou (CN)

( * ) Notice: Subject to any disclaimer, the term of this patent is extended or adjusted under 35 U.S.C. 154(b) by 135 days.

(21) Appl. No.: 18/693,189

(22) PCT Filed: Oct. 13, 2022

(86) PCT No.: PCT/CN2022/125031
§ 371 (c)(1),
(2) Date: Mar. 19, 2024

(87) PCT Pub. No.: WO2023/061428
PCT Pub. Date: Apr. 20, 2023

(65) Prior Publication Data
US 2024/0384808 A1 Nov. 21, 2024

(30) Foreign Application Priority Data
Oct. 13, 2021 (CN) .......................... 202111191252.3

(51) Int. Cl.
*F16K 27/00* (2006.01)
*B60R 16/08* (2006.01)

(52) U.S. Cl.
CPC .............. *F16K 27/00* (2013.01); *B60R 16/08* (2013.01)

(58) Field of Classification Search
CPC ............................. F16K 27/00; B60H 1/3229
See application file for complete search history.

(56) References Cited

U.S. PATENT DOCUMENTS

2020/0353811 A1 11/2020 Wolf et al.
2021/0053415 A1 2/2021 Oh et al.
(Continued)

FOREIGN PATENT DOCUMENTS

CN 110614895 A 12/2019
CN 210851949 U 6/2020
(Continued)

OTHER PUBLICATIONS

International Search Report for PCT/CN2022/125031 mailed Jan. 19, 2023, ISA/CN.
(Continued)

*Primary Examiner* — Elizabeth J Martin
(74) *Attorney, Agent, or Firm* — Yue (Robert) Xu; Apex Attorneys at Law, LLP

(57) ABSTRACT

A fluid control assembly and a thermal management system are provided. The fluid control assembly comprises valve parts, a connecting member, and a flow passage plate, portions of the valve parts are located in mounting chambers of the connecting member, the valve parts are connected to the connecting member, the connecting member is connected to the flow passage plate, the flow passage plate comprises a first plate and a second plate, the first plate and/or the second plate forms grooves or orifices of passages of the flow passage plate, the first plate and the second plate are fitted with each other to form at least some of the passages of the flow passage plate, and the valve parts can (Continued)

be communicated or not in communication with one, or two, or more of the passages of the flow passage plate.

14 Claims, 8 Drawing Sheets

(56) References Cited

U.S. PATENT DOCUMENTS

| | | | |
|---|---|---|---|
| 2021/0260955 A1 | 8/2021 | Dong et al. | |
| 2022/0176774 A1 | 6/2022 | Tang et al. | |
| 2023/0016310 A1* | 1/2023 | Sugiyama | B60H 1/3229 |
| 2024/0198756 A1 | 6/2024 | Cheng et al. | |

FOREIGN PATENT DOCUMENTS

| | | | |
|---|---|---|---|
| CN | 211503790 U | 9/2020 |
| CN | 112129000 A | 12/2020 |
| CN | 112406494 A | 2/2021 |
| CN | 112428774 A | 3/2021 |
| CN | 112477549 A | 3/2021 |
| CN | 112543712 A | 3/2021 |
| CN | 112606676 A | 4/2021 |
| CN | 113335017 A | 9/2021 |
| EP | 4324667 A1 | 2/2024 |
| JP | 2021105457 A | 7/2021 |
| JP | 2021160680 A | 10/2021 |
| KR | 20100027969 A | 3/2010 |

OTHER PUBLICATIONS

The Japanese 1st Office Action issued on Dec. 17, 2024 for JP2024-501171.

The European search report issued on Sep. 16, 2025 for EP22880364.9.

The 1st Office Action dated Oct. 16, 2025 for the Chinese Patent Application No. CN202111191252.3. English Translation of the 1st Office Action.

* cited by examiner

FLUID CONTROL ASSEMBLY AND THERMAL MANAGEMENT SYSTEM

This disclosure is a national phase application of PCT international patent application PCT/CN2022/125031, filed on Oct. 13, 2022 which claims the priority of the Chinese Patent Disclosure No. 202111191252.3, titled "FLUID CONTROL ASSEMBLY AND THERMAL MANAGE-MENT SYSTEM", filed on Oct. 13, 2021 with the China National Intellectual Property Administration, which are incorporated herein by reference in its entirety.

FIELD

The present disclosure relates to the technical field of fluid control, and in particular to a fluid control assembly and a thermal management system.

BACKGROUND

A connecting member of a fluid control assembly in the related art generally includes a portion for mounting valve components and a passage portion for fluid to flow through, which are integrally formed in the connecting member by machine manufacturing. Due to the large number of the passages, the machining process is complicated and the weight of the connecting member is huge, which leads to the huge weight of the fluid control assembly.

SUMMARY

An object of the present disclosure is to provide a fluid control assembly and a thermal management system, which is beneficial to simplifying the machining process and reducing weight.

To achieve the above object, the following technical solution is provided according to the present disclosure.

A fluid control assembly includes valve components and a connecting member, where the connecting member has mounting chambers, part of the valve component is located in the mounting chamber, and the valve component is connected with the connecting member. The fluid control assembly further includes a flow passage plate, where the connecting member is connected with the flow passage plate, and the flow passage plate includes a first plate and a second plate. The first plate and/or the second plate are provided with grooves or orifices forming passages of the flow passage plate, the first plate and the second plate are fitted with each other to form at least part of the passages of the flow passage plate, and the valve component is in communication with or block one or two or more of the passages of the flow passage plate.

A thermal management system includes a compressor, a liquid reservoir, an outdoor heat exchanger, a condenser, an evaporator, an expansion valve and a heat exchange component, and further includes a fluid control assembly with interfaces, where the fluid control assembly is joint and in communication with the compressor, the liquid reservoir, the condenser, the evaporator, the expansion valve and the heat exchange component through the interfaces, and the fluid control assembly is the fluid control assembly as described above.

A fluid control assembly and a thermal management system are provided according to the present disclosure. The fluid control assembly includes valve components, a connecting member and a flow passage plate, where part of the valve component is located in a mounting chamber of the connecting member, the valve component is connected to the connecting member, the connecting member is connected with the flow passage plate, the flow passage plate includes a first plate and a second plate, the first plate and/or the second plate are provided with grooves or orifices forming passages of the flow passage plate, the first plate and the second plate are fitted with each other to form at least part of the passages of the flow passage plate, and the valve component can communicate or block one or two or more of the passages of the flow passage plate. The fluid control assembly has interfaces, and the fluid control assembly is joint and in communication with other components in the thermal management system through the interfaces. By providing the grooves or orifices in the first plate and/or the second plate to form the passages of the flow passage plate, and making the first plate and the second plate to are fitted with each other to form at least part of the passages of the flow passage plate, the machining process is simplified and the weight is reduced, compared with the related art in which the passages are integrally formed in the connecting member by machine manufacturing.

DETAILED DESCRIPTION OF THE EMBODIMENTS

The present disclosure will be further described as follows in conjunction with the drawings and specific embodiments.

Figure 1:
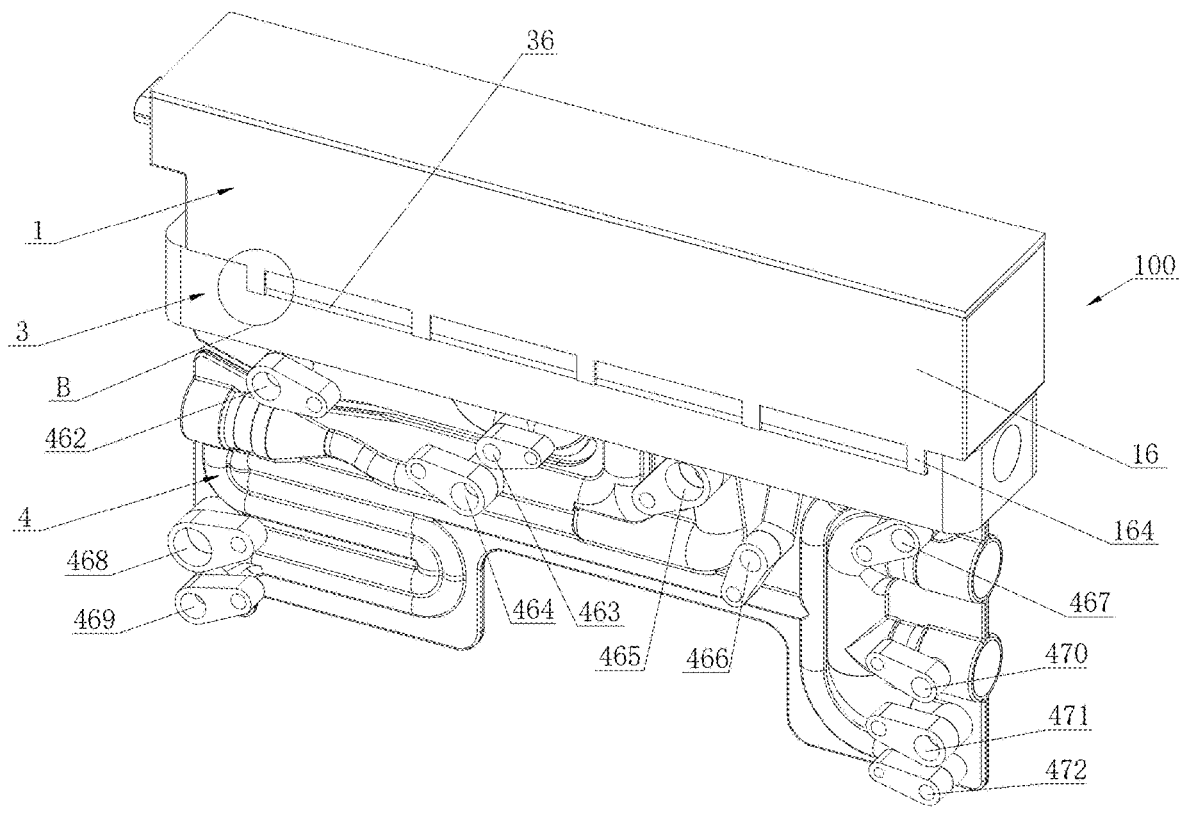
FIG. 1 is a schematic perspective structural view of an embodiment of a fluid control assembly.
Figure 2:
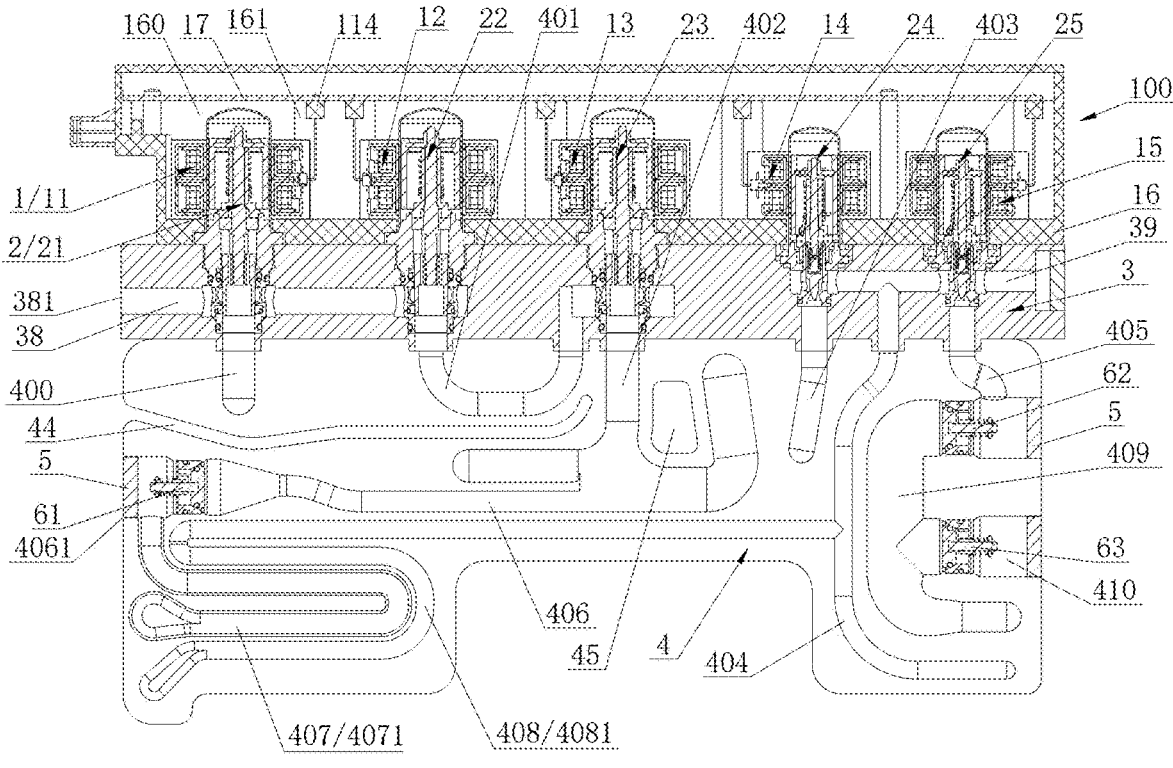
FIG. 2 is a schematic sectional structural view of the fluid control assembly in FIG. 1.

Referring to FIG. 1 and FIG. 2, a fluid control assembly is applicable to a thermal management system, which may be a vehicle thermal management system, such as a new energy vehicle thermal management system. The fluid control assembly 100 includes a driving component 1, a valve component 2, a connecting member 3 and a flow passage plate 4, where the valve component 2 is connected with the connecting member 3, the driving component 1 drives the valve component 2 to operate, the driving component 1 is connected with the connecting member 3, and the flow passage plate 4 is connected with the connecting member 3. The fluid control assembly 100 is provided with a passage, and the number of the passage may be multiple. Under an action of the driving component 1, the valve component 2 can control two or more of the passages to be or be not in communication with each other. Further, in a case that the valve component 2 controls the two or more of the passages to be in communication with each other, the valve component 2 may be in direct communication or throttling communication with two or more of the passages. The term "direct communication" is defined as not changing or tending not to change the pressure before and after a working fluid flows through the valve component (for example, the pressure loss rate is less than 1%), the term "throttling communication" is defined as a case that the pressure before the working fluid flows through the valve component is greater than the pressure after the working fluid flows through the valve component, and the term "connection" is defined as including a fixed connection, a limiting connection, a detachable connection, a sealed connection or an connection by injection-molding.

Figure 3:
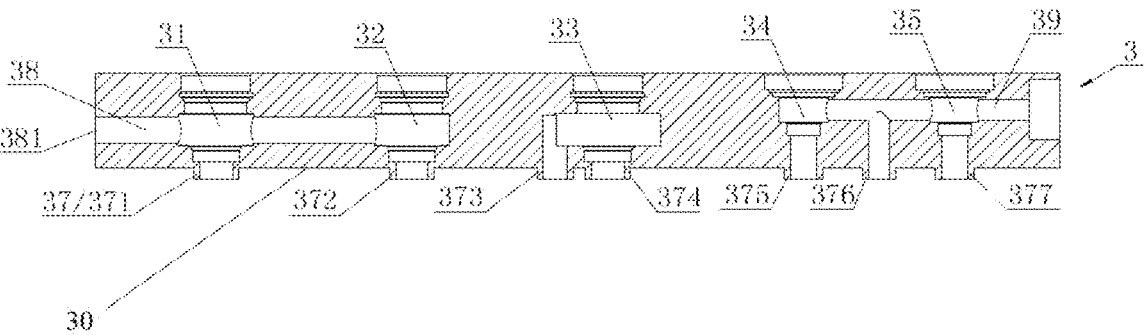
FIG. 3 is a schematic sectional structural view of a connecting member in FIG. 2.

Referring to FIG. 2 and FIG. 3, the number of valve component 2 may be multiple. In this embodiment, the valve components 2 are arranged linearly in sequence. The valve components 2 include a first valve component 21, a second valve component 22, a third valve component 23, a fourth valve component 24 and a fifth valve component 25. Correspondingly, the connecting member 3 has mounting chambers, the number of which is the same as that of the valve components. In this embodiment, the mounting chambers may also be arranged linearly in sequence. The mounting chambers include a first mounting chamber 31, a second mounting chamber 32, a third mounting chamber 33, a fourth mounting chamber 34 and a fifth mounting chamber 35. Part of the valve component is located in the mounting chamber, and the valve components are connected with the connecting member 3. In particular, in this embodiment, part of the first valve component 21 is located in the first mounting chamber 31, part of the second valve component 22 is located in the second mounting chamber 32, part of the third valve component 23 is located in the third mounting chamber 33, part of the fourth valve component 24 is located in the fourth mounting chamber 34, and part of the fifth valve component 25 is located in the fifth mounting chamber35. The driving component 1 includes a driving mechanism, and the number of the driving mechanism may be multiple. In this embodiment, the driving mechanisms include a first driving mechanism 11, a second driving mechanism 12, a third driving mechanism 13, a fourth driving mechanism 14 and a fifth driving mechanism 15. The driving component 1 further includes an outer housing 16 and a circuit board 17, where the outer housing 16 forms an accommodating chamber 160 or forms at least part of the accommodating chamber 160, the driving mechanism and the circuit board 17 are located in the accommodating chamber 160, and the circuit board 17 is connected to the outer housing 16. In this embodiment, the circuit board 17 is detachably connected to the outer housing 16 by screws. Another part of the valve component is located in the accommodating chamber 160, and the driving mechanism is located at an outer periphery of a portion, which is located in the accommodating chamber 160, of the valve component and the driving mechanism is electrically and/or signally connected with the circuit board 17. In particular, in this embodiment, the first driving mechanism 11 is sleeved outside the outer periphery of the portion, which is located in the accommodating chamber 160, of the valve component 21, and the first driving mechanism 11 is electrically and/or signally connected with the circuit board 17. The second driving mechanism 12 is sleeved outside the outer periphery of the portion, which is located in the accommodating chamber 160, of the second valve component 22, and the second driving mechanism 12 is electrically and/or signally connected with the circuit board 17. The third driving mechanism 13 is sleeved outside the outer periphery of the portion, which is located in the accommodating chamber 160, of the third valve component 23, and the third driving mechanism 13 is electrically and/or signally connected with the circuit board 17. The fourth driving mechanism 14 is sleeved outside the outer periphery of the portion, which is located in the accommodating chamber 160, of the fourth valve component 24, and the fourth driving mechanism 14 is electrically and/or signally connected with the circuit board 17. The fifth driving mechanism 15 is sleeved outside the outer periphery of the portion, which is located in the accommodating chamber 160, of the fifth valve component 25, and the fifth driving mechanism 15 is electrically and/or signally connected with the circuit board 17.

Figure 4:
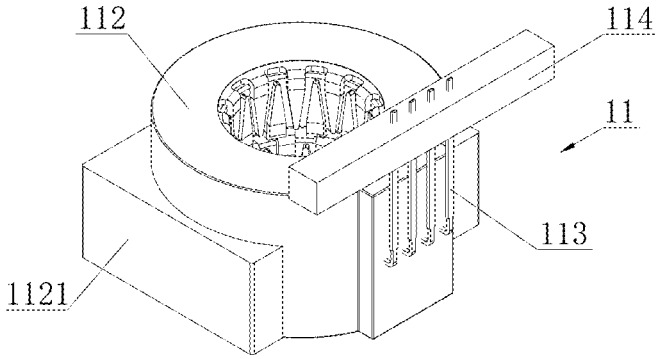
FIG. 4 is a schematic perspective structural view of a driving mechanism in FIG. 2.
Figure 5:
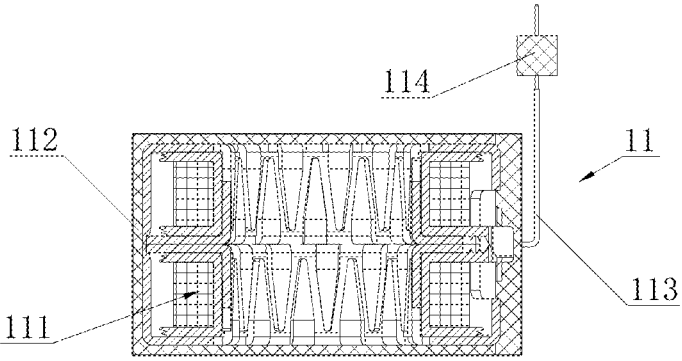
FIG. 5 is a schematic sectional structural view of the driving mechanism in FIG. 4.

Referring to FIG. 2, FIG. 4 and FIG. 5, since there is no obvious difference in the structure of the driving mechanism, the first driving mechanism 11 will be described as an example to avoid repetition. The first driving mechanism 11 includes a coil assembly 111, an encapsulated housing 112 and a pin 113. The encapsulated housing 112 are integrally injection-molded with the coil assembly 111 and the pin 113, which are configured as injection-molding inserts. The encapsulated housing 112 encapsulates at least part of the coil assembly 111. One end of the pin 113 is located in the encapsulated housing 112 and is electrically and/or signally connected with the coil assembly 111, while the other end of the pin 113 is located outside the encapsulated housing 112 and is electrically and/or signally connected with the circuit board 17, thus realizing the electrical and/or signal connection between the first driving mechanism 11 and the circuit board 17. It should be noted that in other embodiments, the number of valve components and the driving mechanisms may be varied, which is determined based on the needs of the practical disclosure.

Referring to FIG. 2 to FIG. 5, in the above structure, the driving mechanisms of the driving component 1 are electrically and/or signally connected to the same circuit board 17, and the valve components 2 are connected to the one single connecting member 3. In a case that there are multiple driving mechanisms and multiple valve components, it is beneficial to the compact structure of the fluid control assembly 100 and saves the material cost. However, it leads to a greater dimension of the outer housing 16 and a greater dimension of the connecting member 3 in a length direction, where the length direction is defined as a direction along which the valve components 2 are linearly distributed. Since the outer housing 16 is made of plastic material and the connecting member 3 is made of metal material, linear expansion coefficients between them are different, and as the temperature of the fluid control assembly 100 changes during operation in the thermal management system, expansion and contraction amounts of them are different in the length direction, thus in a case of dimension accumulation, the expansion and contraction amount of the outer housing 16 along the length direction is greater than that of the connecting member 3. The circuit board 17 is connected with the outer housing 16 (for example, detachably connected by screws in this embodiment), that is, the circuit board 17 follows the expansion and contraction amount of the outer housing 16, while the driving mechanism is sleeved outside the outer periphery of the valve component 2, thus the valve component 2 follows the expansion and contraction amount of the connecting member 3. In this case, the driving mechanism is limited by the valve component 2, that is, the pins electrically and/or signally connecting the driving mechanism with the circuit board 17 are limited by the valve component 2. However, in order to ensure that the valve component 2 can better sense an excitation magnetic field generated by the driving mechanism, an inner peripheral wall of the driving mechanism is attached to an outer peripheral wall of the valve component 2 or only a slight gap is formed between the inner peripheral wall of the driving mechanism and the outer peripheral wall of the valve component 2, which can lead to a displacement deviation of the circuit board 17 relative to the pins during the driven process, and a stress concentration of the connection points between the pins and the circuit board 17 (such as the fixed connection by welding in this embodiment), resulting in unstable connection at the connection points, and influencing the stability and reliability of the electrical and/or signal connection between the driving mechanism and the circuit board 17. It should be noted that the definition of the length direction is only for the convenience of understanding. In addition, since the dimensions of the outer housing 16 in other directions are relatively small, the cumulative deviation caused by linear expansion is small, which will not be considered here.

Figure 6:
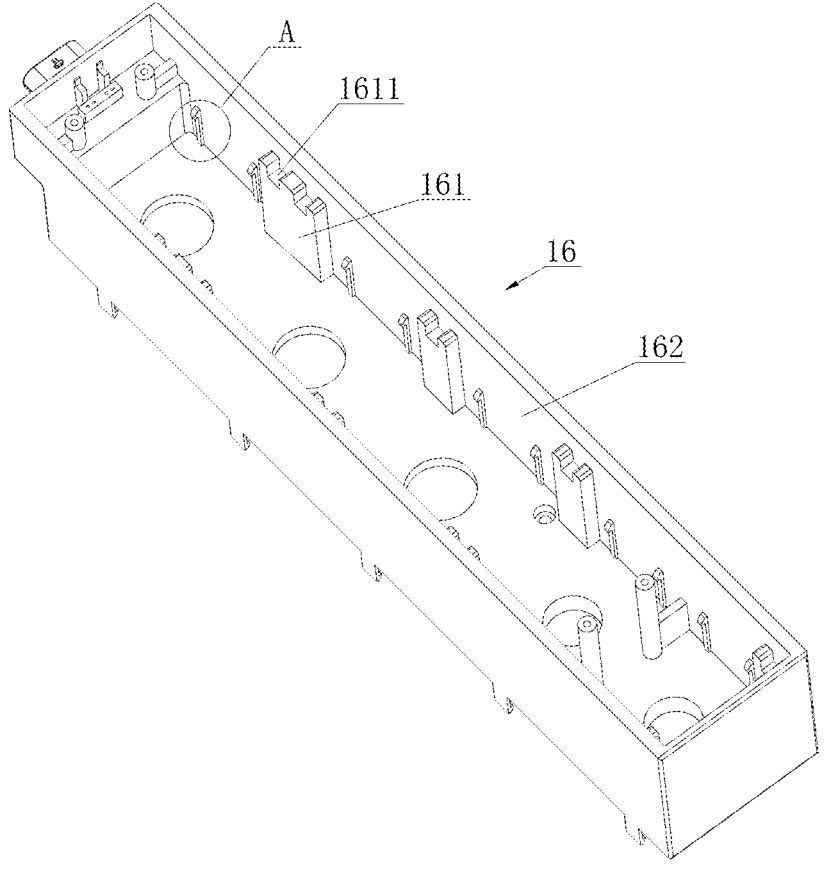
FIG. 6 is a schematic perspective structural view of an outer housing in FIG. 2.
Figure 7:
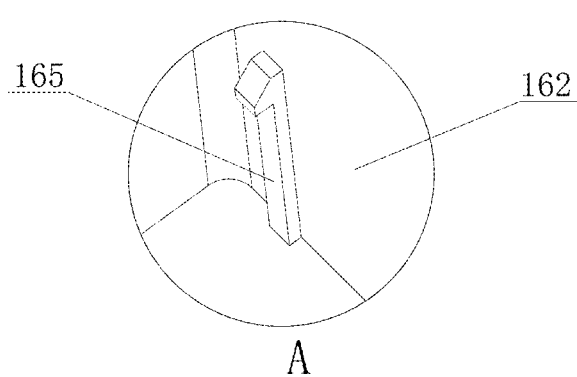
FIG. 7 is a schematic partial enlarged structural view of a portion A in FIG. 6.

In order to solve the above problems, referring to FIG. 2, FIG. 4 and FIG. 6 and taking the first driving mechanism 11 as an example, the first driving mechanism 11 further includes a supporting block 114, which is connected with the pin 113. In this embodiment, the pin 113, used as an injection-molding insert, is integrally injection-molded into the supporting block 114. The pin 113 is arranged to extend through the supporting block 114, and the supporting block 114 is arranged to be closer to the driving mechanism than the circuit board 17 along an axial direction of the valve component 2. In this embodiment, the supporting block 114 is closer to an end of the pin 113 that is electrically and/or signally connected to the circuit board 17. The supporting block 114 is connected with the outer housing 16. In particular, taking the supporting block 114 of the first driving mechanism 11 being connected with the outer housing 16 as an example, in this embodiment, the outer housing 16 further includes a protruding reinforcing rib 161, which protrudes from an inner wall surface 162 of the outer housing 16 in a direction away from the inner wall surface 162 along a width direction of the outer housing 16, and the width direction is defined as a direction that is in a same horizontal plane as the length direction and perpendicular to the length direction. The protruding reinforcing ribs 161 are symmetrically arranged, and the protruding reinforcing rib 161 is provided with a limit groove 1611, which is formed by being recessed inward from an upper end surface of the protruding reinforcing rib 161 along a height direction of the outer housing 16, where the height direction is defined as a direction that is perpendicular to a horizontal plane where the length direction and the width direction are located, and the upper end surface is defined as an end surface of the protruding reinforcing rib 161 close to the circuit board 17 along the height direction. Part of the supporting block 114 is located in a cavity formed by the limiting groove 1611, and the supporting block 114 is limited by the limiting groove 1611 along the length direction of the outer housing 16. By providing the supporting blocks and connecting the supporting blocks 114 with the outer housing 16 (for example, in a limiting way by the limiting groove 1611 in this embodiment), the supporting block is able to move followed by the expansion and contraction amount of the outer housing 16. Along the axial direction of the valve component 2, the connection point between the supporting block and the pin is closer to the driving mechanism than the connection point between the pin and the circuit board 17. This is beneficial to transferring or partially transferring the stress at the connection point between the pin and the circuit board 17 to the injection-molded connection point between the supporting block 114 and the pin 113, thus reducing the stress concentration at the connection point between the pin and the circuit board 17, and improving the stability and reliability of the electrical connection and/or signal connection between the pin 113 and the circuit board 17. In addition, in this embodiment, the supporting blocks 114 also abut against the circuit board 17. By arranging the supporting block 114 to abut against the circuit board 17 and then support the circuit board 17, it is beneficial to reducing the stress concentration at the connection point between the pin and the circuit board on the one hand and enhancing the strength of the circuit board 117 on the other hand.

Figure 8:
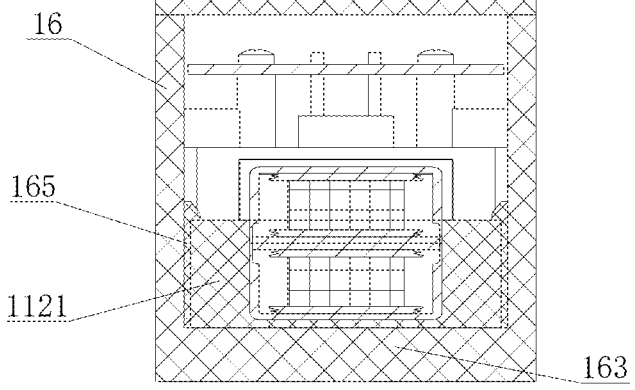
FIG. 8 is a schematic sectional structural view of a driving component in FIG. 2.

Referring to FIG. 4, and FIG. 6 to FIG. 8, the driving mechanism is connected with the outer housing 16. In particular, taking the connection of the first driving mechanism 11 with the outer housing 16 as an example, in this embodiment, the encapsulated housing 112 of the first driving mechanism further includes a step portion 1121, which is a non-rotating body. As shown in FIG. 4 and FIG. 8, a cross section of the housing 112 in the width direction is in a rectangular shape, and a cross section of the step portion 1121 in the width direction is also in a rectangular shape. The stepped portion 1121 cannot rotate relative to the inner chamber of the housing 112 after being mounted therein. Correspondingly, the outer housing 16 further includes an inner buckle 165, which is also formed along the width direction of the outer housing 16 and protrudes from the inner wall surface 162 of the outer housing 16 in a direction away from the inner wall surface 162. The inner buckles 165 may be symmetrically arranged. Along the height direction of the outer housing 16, the step portion 1121 is located between the buckle portion of the inner buckle 165 and the bottom wall 163 of the outer housing 16. The buckle portion of the inner buckle 165 abuts against the step portion 1121, and the step portion 1121 abuts against the bottom wall 163 of the outer housing 16. The first driving mechanism 11 is in a limited connection with the outer housing 16 by the cooperation of the step portion 1121 and the buckle portion of the inner buckle 165. By arranging the step portion 1121 as a non-rotating body and connecting the step portion 1121 with the outer housing 16, it will not only facilitate the assembly and positioning of the driving mechanism, but also is beneficial to the driving mechanism to move followed with the outer housing 16 in the length direction within the clearance range with the valve component 2. Further, it also helps to reduce the stress concentration at the connection point between the pin and the circuit board 17 to some extent, thus improving the stability and reliability of the electrical connection and/or signal connection between the pin and the circuit board 17.

Figure 9:
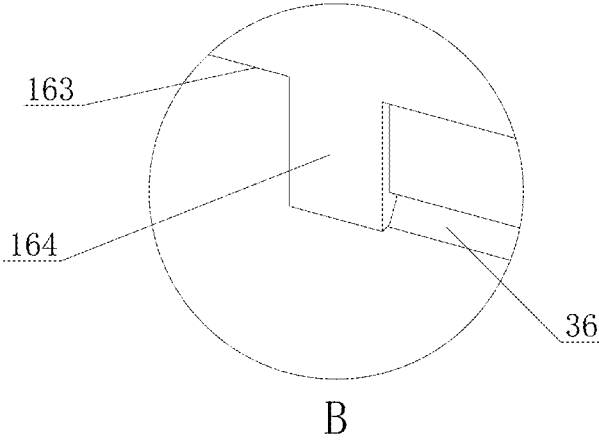
FIG. 9 is a schematic partial enlarged structural view of a portion B in FIG. 1.
Figure 10:
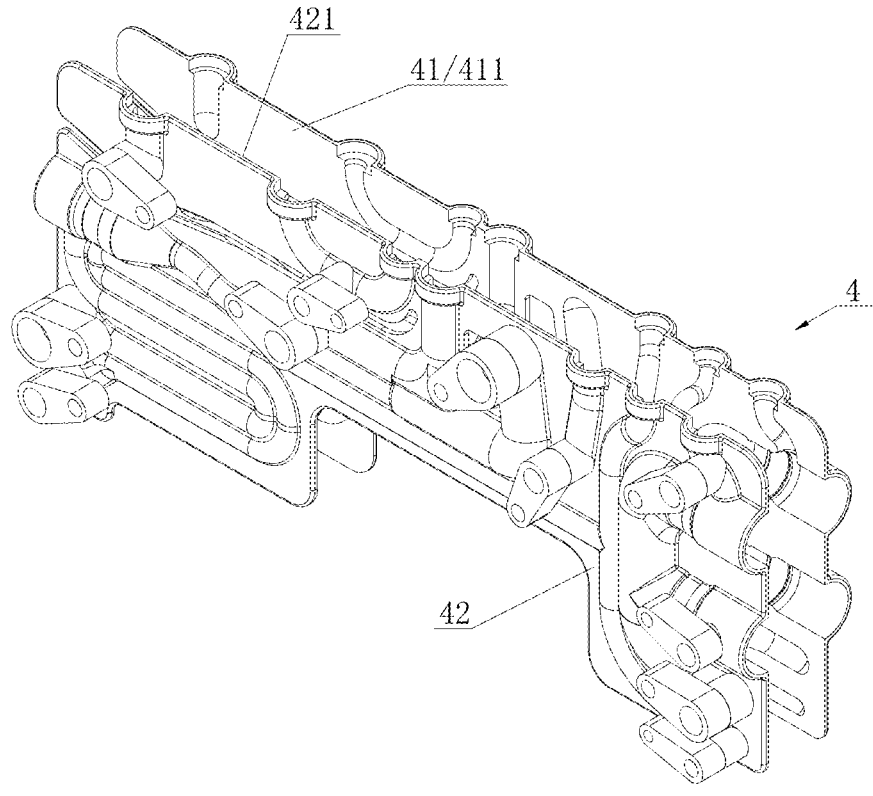
FIG. 10 is a schematic exploded structural view of a flow passage plate in FIG. 1.
Figure 11:
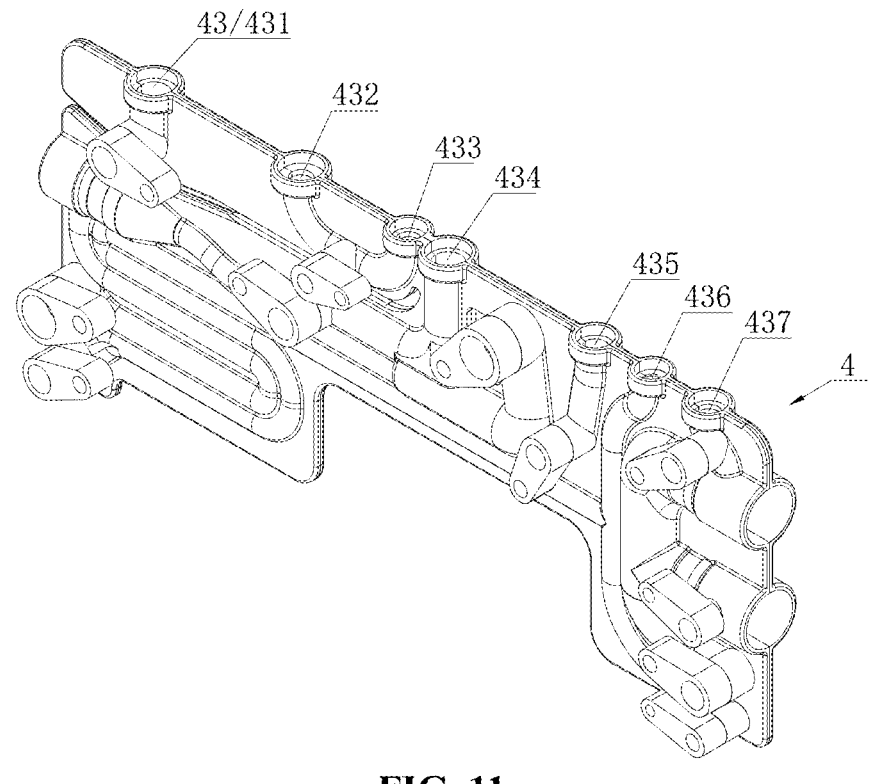
FIG. 11 is a schematic perspective structural view of the flow passage plate in FIG. 10.

Referring to FIG. 1 and FIG. 9, the driving component 1 is further connected with the connecting member 3 through the outer housing 16. In particular, in this embodiment, the outer housing 16 further includes an external buckle 164, which is formed by protruding from the outer wall surface of the bottom wall 163 in a direction away from the outer wall surface along the height direction of the outer housing 16. The number of the external buckles 164 may be multiple, and the external buckles 164 may be symmetrically arranged. Correspondingly, the connecting member 3 further includes a buckle groove 36. The buckle groove 36 is recessed inward from the side wall of the connecting member 3 along the width direction of the outer housing 16. When the driving component 1 is connected with the connecting member 3, the bottom wall 163 of the outer housing 16 abuts against the connecting member 3, a buckle portion of the external buckle 164 abuts against the buckle groove 36, and at least part of the buckle portion of the external buckle 164 is located in the groove chamber formed by the buckle groove 36. By arranging the driving component 1 to be clamped with the connecting member 3, on the one hand, it is beneficial to reducing the connection space and make the structure compact and miniaturized, and on the other hand, it is beneficial for the outer housing 16 to be driven in the length direction through the buckle groove 36 as being linearly expanded and contracted. Compared with the case that the outer housing 16 is fixedly connected with the connecting member 3 by screws or other means, it is beneficial to reduce the stress concentration caused by linear expansion of the outer housing 16 and improve the service life of the outer housing 16.

Referring to FIG. 2 and FIG. 3, the connecting member 3 further includes a protruding portion 37. In this embodiment, the protruding portion 37 is formed by protruding from a bottom wall 30 of the connecting member 3 in the direction away from the bottom wall 30 along the axial direction of the mounting chamber, and the bottom wall 30 is defined as a wall of the connecting member 3 close to the flow passage plate 4 along the axial direction of the mounting chamber. The number of the protruding portion 37 may be multiple. In this embodiment, the protruding portions 37 include a first protruding portion 371, a second protruding portion 372, a third protruding portion 373, a fourth protruding portion 374, a fifth protruding portion 375, a sixth protruding portion 376, and a seventh protruding portion 377, which are arranged linearly in sequence. The protruding portion 37 has a communication port, and the connecting member 3 further has a first passage 38 and a second passage 39, where the first passage 38 includes a first interface 381. For the connecting member 3 as a single component, the first mounting chamber 31 is in communication with the first interface 381 and the communication port of the first protruding portion 371 through the first passage 38, the second mounting chamber 32 is in communication with the first interface 381 and the communication port of the second protruding portion 372 through the first passage 38, the third mounting chamber 33 is in communication with the communication port of the third protruding portion 373 and the communication port of the fourth protruding portion 374, the fourth mounting chamber 34 is in communication with the communication port of the fifth protruding portion 375 and the communication port of the sixth protruding portion 376 through the second passage 39, and the fifth mounting chamber 35 is in communication with the communication port of the sixth protruding portion 376 and the communication port of the seventh protruding portion 377 through the second passage 39.

Referring to FIG. 2, FIG. 3, FIG. 10 and FIG. 11, the flow passage plate 4 is provided with passages, and the flow passage plate 4 includes a first plate 41 and a second plate 42, where the first plate 41 and/or the second plate 42 are provided with grooves or orifices forming the passages of the flow passage plate 4. The first plate 41 and the second plate 42 are fitted with each other to form a complete passage of the flow passage plate 4. In this embodiment, the first plate 41 and/or the second plate 42 are formed by stamping a plate material, and the first plate 41 includes a first wall 411. In a direction perpendicular to the first wall 411, part of the passage of the flow passage plate 4 away from the first wall 411 is formed by stamping the first plate 41. In particular, one half of the passage of the flow passage plate 4 away from the first wall 411 is formed by stamping the first plate 411. The second plate 42 includes a second wall 421. In the direction perpendicular to the second wall 421, the other part of the passage of the flow passage plate 4 away from the second wall 421 is formed by stamping the second plate 42. In particular, the other half of the passage of the flow passage plate 4 away from the second wall 421 is formed by stamping the second plate 42. The first wall 411 is attached to and connected to the second wall 421, for example in this embodiment, the first wall 411 is fixedly connected to the second wall 421 by welding. The flow passage plate 4 has an accommodation chamber 43, which is formed by a part of the passages of the flow passage plate 4, and at least a part of the protruding portion 37 of the connecting member 3 is located in the accommodation chamber 43. The communication port of the protruding portion 37 is in communication with a passage forming the accommodation chamber 43, and the protruding portion 37 is connected with the flow passage plate 4, thus realizing the connection between the connecting member 3 and the flow passage plate 4. For example, in this embodiment, the protruding portion 37 is fixedly connected with the flow passage plate 4 by welding. In the direction of a central axis of the valve component 2, the connecting member 3 is arranged to be closer to the valve component 2 than the flow passage plate 4, the central axis of the valve component 2 is parallel to or tends to be parallel to the first wall and/or the second wall, and the flow passage plate 4 abuts against the connecting member 3 or there is a gap formed between the flow passage plate 4 and the connecting member 3. The number of the accommodation chambers 43 is the same as that of the protruding portions 37. Specifically, in this embodiment, the accommodation chambers 43 include a first accommodation chamber 431, a second accommodation chamber 432, a third accommodation chamber 433, a fourth accommodation chamber 434, a fifth accommodation chamber 435, a sixth accommodation chamber 436 and a seventh accommodating chamber 437. At least part of the first protruding portion 371 is located in the first accommodation chamber 431, at least part of the second protruding portion 372 is located in the second accommodation chamber 432, at least part of the third protruding portion 373 is located in the third accommodation chamber 433, at least part of the fourth protruding portion 374 is located in the fourth accommodation chamber 434, at least part of the fifth protruding portion 375 is located in the fifth accommodation chamber 435, at least part of the sixth protruding portion 376 is located in the sixth accommodation chamber 436, and at least part of the seventh protruding portion 377 is located in the seventh accommodation chamber 437. Compared with the related art in which the passage is integrally formed in the connecting member by machine manufacturing, the case in which the arrangement of the first plate 41 and/or the second plate 42 is formed by stamping the plate material and the passage of the flow passage plate 4 is formed by the cooperation of the first plate 41 and the second plate 42 is beneficial to simplifying the machining process of the passage and reducing the weight of the fluid control assembly 100. Also, in other embodiments, the flow passage plate may further include, but not limited to, a third plate. For example, the second plate is located between the first plate and the third plate, the first plate and the second plate are fitted with each other to form a part of the passage of the flow passage plate, and the second plate and the third plate are fitted with each other to form another part of the passage of the flow passage plate. In addition, in other embodiments, it is conceivable that the protruding portion can also be formed on the flow passage plate, and the communication port of the protruding portion becomes a part of the passages of the flow passage plate. The connecting member has an accommodation chamber, which is recessed inward from the bottom wall of the connecting member along the axial direction of the mounting chamber. For the connecting member, the accommodation chamber is in communication with the mounting chamber. At least part of the protruding portion is located in the accommodation chamber, the flow passage plate is connected with the connecting member through the protruding portion, and the accommodation chamber is in communication with the passage, which forms the communication port, through the communication port.

Referring to FIG. 1 and FIG. 2, in this embodiment, the passages of the flow passage plate 4 include a third passage 400, a fourth passage 401, a fifth passage 402, a sixth passage 403, a seventh passage 404 and an eighth passage 405, where the first accommodation chamber 431 is formed by the third passage 400, and the communication port of the first protruding portion 371 is in communication with the third passage 400. Therefore, the first valve component 21 can communicate or block the first passage 38 with the third passage 400, and the first valve component 21 can throttlingly or directly communicates the first passage 38 with the third passage 400 when being in communication with them. Similarly, the second accommodation chamber 432 is formed by the fourth passage 401, and the communication port of the second protruding portion 372 is in communication with the fourth passage 401. Therefore, the second valve component 22 can communicate or block the first passage 38 with the fourth passage 401, and the second valve component 22 can throttling directly communication the first passage 38 with the fourth passage 401 when being in communication with them. The third accommodation chamber 433 is further formed by the fourth passage 401, and the communication port of the third protruding portion 373 is in communication with the fourth passage 401. The fourth accommodation chamber 434 is formed by the fifth passage 402, and the communication port of the fourth protruding portion 374 is in communication with the fifth passage 402. Therefore, the third valve component 23 can communicates or block the fourth passage 401 with the fifth passage 402, and the third valve component 23 can throttlingly or directly communicates the fourth passage 401 with the fifth passage 402 when being in communication with them. The fifth accommodation chamber 435 is formed by the sixth passage 403, and the communication port of the fifth protruding portion 375 is in communication with the sixth passage 403. The sixth accommodation chamber 436 is formed by the seventh passage 404, and the communication port of the sixth protruding portion 376 is in communication with the seventh passage 404. Therefore, the fourth valve component 24 can communicates or block the sixth passage 403 with the seventh passage 404 through the second passage 39, and the fourth valve component 24 throttlingly communicates the sixth passage 403 with the seventh passage 404 when being in communication with them. The seventh accommodation chamber 437 is formed by the eighth passage 405, and the communication port of the seventh protruding portion 377 is in communication with the eighth passage 405. Therefore, the fifth valve component 25 can communicates or block the seventh passage 404 with the eighth passage 405 through the second passage 39, and the fifth valve component 25 throttlingly communicates with the seventh passage 404 with the eighth passage 405 when being in communication with them.

Referring to FIG. 1 and FIG. 2, in this embodiment, the passages of the flow passage plate 4 further include a ninth passage 406, a tenth passage 407, an eleventh passage 408, a twelfth passage 409 and a thirteenth passage 410. For the flow passage plate 4 per se, the ninth passage 406 is in communication with the fifth passage 402, the tenth passage 407 is in communication with the ninth passage 406, the eleventh passage 408 is in communication with the seventh passage 404, the twelfth passage 409 is in communication with the eighth passage 405, and the thirteenth passage 410 is in communication with the twelfth passage 409. The fluid control assembly 100 further includes a one-way valve 6 which has the functions of being in communication in only one direction and being cutoff in reverse direction under the action of fluid pressure difference. For example, in this embodiment, the one-way valve 6 includes a first one-way valve 61, a second one-way valve 62 and a third one-way valve 63, where the first one-way valve 61 is located in the ninth passage 406. Along the axial direction of the first one-way valve 61, the valve port of the first one-way valve 61 is located farther away from the machining opening 4061 of the ninth passage 406 than the connecting portion of the ninth passage 406 and the connecting portion of the tenth passage 407, and the machining opening 4061 is sealed and blocked with a plug 5. The machining opening 4061 is mainly used for conveniently mounting the first one-way valve 61. The first one-way valve 61 is able to communicate the tenth passage 407 with the ninth passage 406 in only one direction. Similarly, the second one-way valve 62 is located in the twelfth passage 409. In the axial direction of the second one-way valve 62, the valve port of the second one-way valve 62 is located farther away from the machining opening of the twelfth passage 409 than the connecting portion of the twelfth passage 409 and the connecting portion of the eighth passage 405. The machining opening of the twelfth passage 409 is also sealed and blocked by the plug 5. The second one-way valve 62 is able to communicate the eighth passage 405 with the twelfth passage 409 in only one direction. The third one-way valve 63 is located in the thirteenth passage 410. In the axial direction of the third one-way valve 63, the valve port of the third one-way valve 62 is located closer to the machining opening of the thirteenth passage 410 than the connecting portion of the thirteenth passage 410 and the connecting portion of the twelfth passage 409. The machining opening of the thirteenth passage 410 is also sealed and blocked by the plug 5. The third one-way valve 63 is able to communicate the thirteenth passage 410 with the twelfth passage 409 in only one direction.

Referring to FIG. 2, in this embodiment, at least part of the tenth passage 407 is arranged to be close to the eleventh passage 408. In particular, the tenth passage 407 includes a first passage segment 4071, and correspondingly, the eleventh passage 408 includes a second passage segment 4081 formed around the first passage segment 4071. The first passage segment 4071 is arranged to be close to the second passage segment 4081. The working fluid in the first passage segment 4071 can be heat exchanging with the working fluid in the first passage segment 4071. In this embodiment, the first passage segment 4071 is generally U-shaped, and correspondingly, the second passage segment 4081 formed around the first passage segment 4071 is also U-shaped. Configuring the first passage segment 4071 and the second passage segment 4081 to be U-shaped is beneficial to increasing the heat exchange area and make the passage structure compact. Also, in other embodiments, the first passage segment 4071 and the second passage segment 4081 may be in other shapes. Arranging the first passage segment 4071 to be close to the second passage segment 4081 is beneficial to increasing the efficiency of heat exchanging between the passages, so that it will be beneficial to the system when the fluid control assembly 100 is applied to the system. Also, in order to avoid adverse heat exchanging between some of the passages, thermal insulation measurements are further provided between these passages. For example, in this embodiment, the flow passage plate 4 further includes a first groove 44, which extends through the flow passage plate 4. In the axial direction of the valve component 2, the third passage 400 and the fourth passage 401 are located on one side of the first groove 44, and at least part of the fifth passage 402 and at least part of the ninth passage 406 are located on the other side of the first groove 44. Referring to FIG. 2, in this embodiment, the flow passage plate 4 further includes a second groove 45, which is also arranged to extend through the flow passage plate 4, and is mainly configured for reducing the weight of the runner plate 4.

Referring to FIG. 1 and FIG. 2, the fluid control assembly 100 has an interface, through which the fluid control assembly 100 can be joint and in communication with other components in the thermal management system. In this embodiment, in addition to the first interface 381 mentioned above, interfaces a second interface 462, a third interface 463, a fourth interface 464, a fifth interface 465, a sixth interface 466, a seventh interface 467, an eighth interface 468, a ninth interface 469, a tenth interface 470, an eleventh interface 471 and a twelfth interface 472 are further provided, where the second interface 462 is in communication with the third passage 400, the third interface 463 is in communication with the fourth passage 401, the fourth interface 464 is in communication with the fifth passage 402, the fifth interface 465 is in communication with the ninth passage 406, the sixth interface 466 is in communication with the sixth passage 403, the seventh interface 467 is in communication with the eighth passage 405, the eighth interface 468 is in communication with the tenth passage 407, the ninth interface 469 is in communication with the eleventh passage 408, the tenth interface 470 is in communication with the thirteenth passage 410, the eleventh interface 471 is in communication with the twelfth passage 409, and the twelfth interface 472 is in communication with the seventh passage 404. In this way, the first valve component 21 can communicate and block the first interface 381 with the second interface 462, and the first interface 381 and the second interface 462 are in direct communication or throttling communication when being in communication. The second valve component 22 can communicate and block the first interface 381 with the third interface 463, and the first interface 381 and the third interface 463 are in direct communication or throttling communication when being in communication. The third valve component 23 can communicate and block the third interface 463 with the fourth interface 464, and the third interface 463 and the fourth interface 464 are in direct communication or throttling communication when being in communication, and the fourth interface 464 is in communication with the fifth interface 465. The fourth valve component 24 can communicate and block the twelfth interface 472 with the sixth interface 466, and the twelfth interface 472 and the sixth interface 466 are in throttling communication when being in communication. The fifth valve component 25 can communicate and block the twelfth interface 472 with the seventh interface 467, and the twelfth interface 472 and the seventh interface 467 are in throttling communication when being in communication. The first one-way valve 61 communicates the eighth interface 468 with the fifth interface 465 in only one direction, and the ninth interface 469 is in communication with the twelfth interface 472. The second one-way valve 62 communicates the seventh interface 467 with the eleventh interface 471 in only one direction, and the third one-way valve 63 communicates the tenth interface 470 with the eleventh interface 471 in only one direction, and. In this embodiment, the second interface 462 to the twelfth interface 472 are all located on the same side of the flow passage plate 4, and the first interface 381 is located on one side of the connecting member 3, which facilitates the interfaces of being joint with other components of the thermal management system. Also, in other embodiments, the interfaces can also be located on different sides of the flow passage plate 4.

Figure 12:
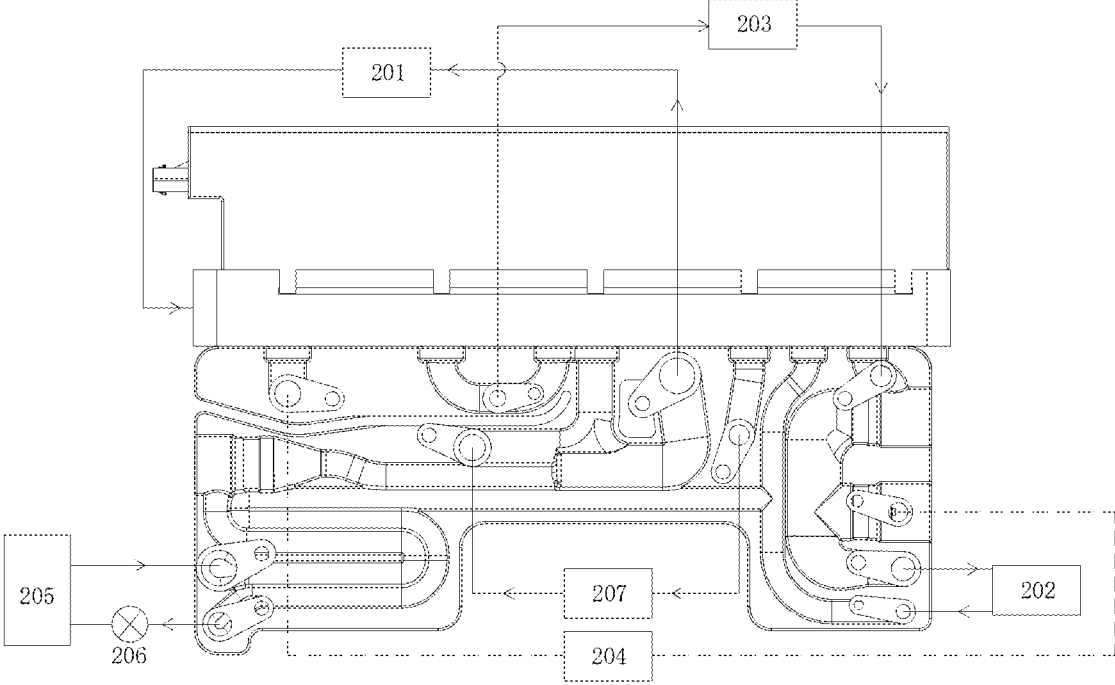
FIG. 12 is a schematic view showing a system structure of an embodiment of a fluid control assembly being applied in a thermal management system in a first operation mode.

Referring to FIG. 1, FIG. 2 and FIG. 12, it is an embodiment in which the fluid control assembly 100 is applied to a thermal management system. In this embodiment, the thermal management system includes a compressor 201, a liquid reservoir 202, an outdoor heat exchanger 203, a condenser 204, an evaporator 205 and an expansion valve 206, where an outlet of the compressor 201 is joint and in communication with the first interface 381, and an inlet of the compressor 201 is joint and in communication with the fifth interface 465, an inlet of the liquid reservoir 202 is joint and in communication with the eleventh interface 471, and an outlet of the liquid reservoir 202 is joint and in communication with the twelfth interface 472. One port of the outdoor heat exchanger 203 is joint and in communication with the third interface 463, and the other port of the outdoor heat exchanger 203 is joint and in communication with the seventh interface 467. An inlet of the condenser 204 is joint and in communication with the second interface 462, and an outlet of the condenser 204 is joint and in communication with the tenth interface 470. An outlet of the evaporator 205 is joint and in communication with the eighth interface 468, and an inlet of the evaporator 205 is joint and in communication with the ninth interface 469 through the expansion valve 206. The expansion valve 206 can throttle the working fluid flowing therethrough. In this embodiment, the thermal management system further includes a heat exchange component 207, which has a first flow passage and a second flow passage that are not directly in communication with each other. The heat exchange component 207 may relate to heat exchanging between the working fluid (such as refrigerant) in the first flow passage and the working fluid (such as coolant) in the second flow passage. It is provided that an inlet of the first flow passage of the heat exchange component 207 is joint and in communication with the sixth interface 466, and an outlet of the first flow passage is joint and in communication with the fourth interface 464.

In this embodiment, the fluid control assembly 100 being applied to the thermal management system includes but not limited to the following two operation modes.

Referring to FIG. 1, FIG. 2 and FIG. 12, the first operation mode is indicated by the solid line in FIG. 12. In the first operation mode, the first valve component 21, the third valve component 23 and the fifth valve component 25 are closed, and the second valve component 22 and the fourth valve component 24 are opened, where the second valve component 22 directly communicates the first interface 381 with the third interface 463, and the fourth valve component 24 throttlingly communicates the twelfth interface 472 with the sixth interface 466, and the expansion valve 206 is opened at this time.

The specific working process is as follows: the high-temperature and high-pressure gas-phase working fluid (such as refrigerant) at the outlet side of the compressor 201 enters the first passage 38 of the fluid control assembly through the first interface 381, flows to the outdoor heat exchanger 203 from the third interface 463 through the second valve component 22, and becomes a gas-liquid two-phase working fluid after being condensed and heat dissipated by the outdoor heat exchanger 203 and then flows into the eighth passage 405 of the fluid control assembly from the seventh interface 467. Under the communication function of the second one-way valve 62 in only one direction, the working fluid flows to the liquid reservoir 202 through the eleventh interface 471, and, after gas-liquid separation in the liquid reservoir 202, the liquid-phase working fluid flows into the seventh passage 404 of the fluid control assembly from the twelfth interface 472, where part of the liquid-phase working fluid flows to the expansion valve 206 from the ninth interface 469 through the eleventh passage 408. After being throttled and expanded by the expansion valve 206, the liquid-phase working fluid becomes low-temperature and low-pressure gas-liquid two-phase working fluid and flows to the evaporator 205, and becomes gas-phase saturated working fluid after being evaporated by the evaporator 205 and absorbing heat, and then flows into the tenth passage 407 of the fluid control assembly from the eighth interface 468. The working fluid with lower temperature in the tenth passage 407 can exchange heat with the working fluid with higher temperature in the eleventh passage 408. Specifically, the working fluid in the first passage segment 4071 of the tenth passage 407 can efficiently exchange heat with the working fluid in the second passage segment 4081 of the eleventh passage 408, thus ensuring that the working fluid in the tenth passage 407 is saturated gas-phase working fluid. The saturated gas-phase working fluid in the tenth passage 407 flows to the ninth passage 406 under the communication function of the first one-way valve 61 in only one direction, and then flows to the inlet of the compressor 201 through the fifth interface 465 for recycling. Another part of the liquid-phase working fluid in the seventh passage 404 becomes a low-temperature and low-pressure gas-liquid two-phase working fluid after being throttled by the fourth valve component 24, then flows into the sixth passage 403 and flows to the first passage of the heat exchange component 207 from the sixth interface 466. After heat exchanging and heat absorption with the working fluid in the second passage, it becomes a gas-phase saturated working fluid, flows into the fifth passage 402 of the fluid control assembly from the fourth interface 464 and flows to the inlet of the compressor 201 through the fifth interface 465 for recycling.

Figure 13:
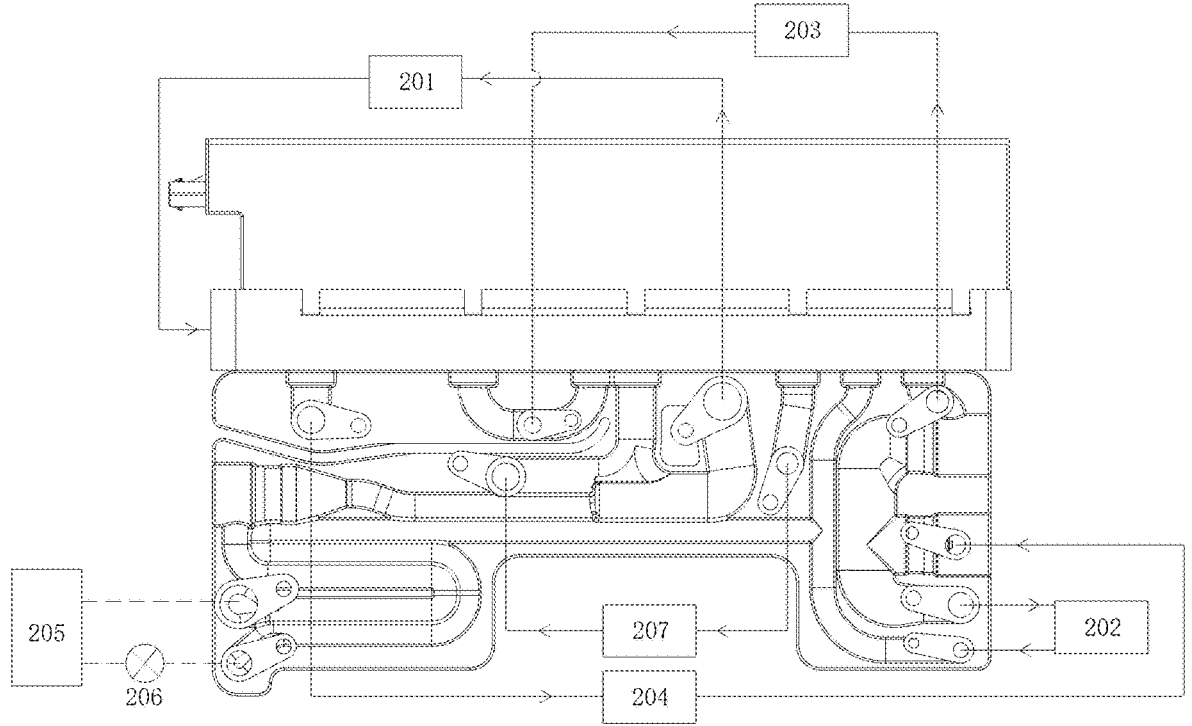
FIG. 13 is a schematic view showing a system structure of the thermal management system in FIG. 12 in a second operation mode.

Referring to FIG. 1, FIG. 2 and FIG. 13, the second operation mode is implemented as shown in the in FIG. 13. In the second operation mode, the first valve component 21, the third valve component 23, the fourth valve component 24 and the fifth valve component 24 are open, and the second valve component 22 is closed, where the first valve component 21 directly communicates the first interface 381 with the second interface 462, the third valve component 23 directly communicates the third interface 463 with the fifth interface 465, the fourth valve component 24 throttlingly communicates the twelfth interface 472 with the sixth interface 466, and the fifth valve component 25 throttling communicates the twelfth interface 472 with the seventh interface 467, and the expansion valve 206 is closed at this time.

The specific working process is as follows: the high-temperature and high-pressure gas-phase working fluid at the outlet side of the compressor 201 enters the first passage 38 of the fluid control assembly from the first interface 381, flows to the condenser 204 from the second interface 462 through the first valve component 21, and becomes a gas-liquid two-phase working fluid after being condensed and heat dissipated by the condenser 204 and then flows to the thirteenth passage 410 of the fluid control assembly from the tenth interface 470. Under the communication function of the third one-way valve 62 in only one direction, the working fluid flows into the twelfth passage 409 and flows to the liquid reservoir 202 from the eleventh interface 471. At this time, the second one-way valve 62 is in cutoff state in reverse direction. After gas-liquid separation in the liquid reservoir 202, the liquid-phase working fluid flows into the seventh passage 404 of the fluid control assembly from the twelfth interface 472. Since the expansion valve 206 is closed, part of the liquid-phase working fluid in the seventh passage 404 now is throttled by the fifth valve component 25 and becomes a low-temperature and low-pressure gas-liquid two-phase working fluid, and then flows to the outdoor heat exchanger 203 from the seventh interface 467. After being evaporated and heat absorption by the outdoor heat exchanger 203, the two-phase working fluid becomes a gas-phase saturated working fluid, flows to the fourth passage 401 of the fluid control assembly from the third interface 463, flows into the fifth passage 402 through the third valve component 23, and then flows to the inlet of the compressor 201 through the fifth interface 465 for recycling. The other part of the liquid-phase working fluid in the seventh passage 404 is throttled by the fourth valve component 24, and becomes a low-temperature and low-pressure gas-liquid two-phase working fluid and flows into the sixth passage 403, and then flows into the first passage of the heat exchange component 207 from the sixth interface 466. After heat exchanging and heat absorption with the working fluid in the second passage, the gas-liquid two-phase working fluid becomes a gas-phase saturated working fluid, flows into the fifth passage 402 of the fluid control assembly from the fourth interface 464, and flows to the inlet of the compressor 201 through the fifth interface 465 for recycling.

The above embodiments are only used to illustrate the present disclosure rather than limit the technical solutions described in the present disclosure, for example, the definition of directionality such as "front", "back", "left", "right", "up" and "down". Although the present disclosure is described in detail in this specification with reference to the above embodiments, those of ordinary skill in the art should understand that those skilled in the art may still modify or equivalently replace the present disclosure, and all technical solutions and improvements thereof that do not depart from the spirit and scope of the present disclosure shall be covered within the scope of the claims of the present disclosure.

The invention claimed is:

1. A fluid control assembly, comprising a valve component and a connecting member, wherein the connecting member has a mounting chamber, part of the valve component is located in the mounting chamber, and the valve component is connected with the connecting member, wherein the fluid control assembly further comprises a flow passage plate, the connecting member is connected with the flow passage plate, and the flow passage plate comprises a first plate and a second plate, wherein the first plate and/or the second plate are provided with grooves or orifices forming passages of the flow passage plate, the first plate and the second plate are fitted with each other to form at least part of the passages of the flow passage plate, and the valve component is able to communicate or block one or two or more of the passages of the flow passage plate, wherein, in a direction of a central axis of the valve component, a bottom wall of the connecting member is arranged closer to the flow passage plate than a bottom of the valve component.

2. The fluid control assembly according to claim 1, wherein the first plate comprises a first wall, and a part of the passages of the flow passage plate is formed in the first plate away from the first wall in a direction perpendicular to the first wall, wherein the second plate comprises a second wall, and a part of the passages of the flow passage plate is formed in the second plate away from the second wall in a direction perpendicular to the second wall, wherein the first wall is affixed to the second wall and is connected with the second wall, and the first plate and the second plate are fitted with each other to form the passages of the flow passage plate.

3. The fluid control assembly according to claim 2, wherein along the direction of the central axis of the valve component, the connecting member is arranged closer to the valve component than the flow passage plate, the central axis of the valve component is parallel to or tends to be parallel to the first wall and/or the second wall, and the flow passage plate abuts against the connecting member or a gap is formed between the flow passage plate and the connecting member.

4. The fluid control assembly according to claim 3, wherein the connecting member comprises a protruding portion, which is formed by protruding from a bottom wall of the connecting member in a direction away from the bottom wall along an axial direction of the mounting chamber, the flow passage plate is provided with an accommodation chamber, which is a part of the passages of the flow passage plate, and at least part of the protruding portion is located in the accommodation chamber, wherein the protruding portion is connected with the flow passage plate and has a communication port, which is in communication with the passage forming the accommodation chamber.

5. The fluid control assembly according to claim 4, wherein the connecting member has a first passage and a second passage, the passages of the flow passage plate comprise a third passage, a fourth passage, a fifth passage, a sixth passage, a seventh passage and an eighth passage, and the valve components comprise a first valve component, a second valve component, a third valve component, a fourth valve component and a fifth valve component, wherein the first valve component is configured to communicate and block the first passage with the third passage, the second valve component is configured to communicate and block the first passage with the fourth passage, the third valve component is configured to communicate and block the fourth passage with the fifth passage, the seventh passage is in communication with the second passage, the fourth valve component is configured to communicate and block the seventh passage with the sixth passage through the second passage, and the fifth valve component is configured to communicate and block the seventh passage with the eighth passage through the second passage.

6. The fluid control assembly according to claim 5, wherein the first valve component is configured to throttlingly communicate or directly communicate the first passage with the third passage, the second valve component is configured to throttlingly communicate or directly communicate the first passage with the fourth passage, the third valve component is configured to throttlingly communicate or directly communicate the fourth passage with the fifth passage, the fourth valve component is configured to throttlingly communicate or directly communicate the seventh passage with the sixth passage, and the fifth valve component is configured to throttlingly communicate or directly communicate the seventh passage with the eighth passage.

7. The fluid control assembly according to claim 6, wherein the passages of the flow passage plate further comprises a ninth passage, a tenth passage, an eleventh passage, a twelfth passage and a thirteenth passage, wherein the ninth passage is in communication with the fifth passage, and the eleventh passage is in communication with the seventh passage, the fluid control assembly further comprises a first one-way valve, a second one-way valve and a third one-way valve, wherein the first one-way valve is located in the ninth passage and communicates the tenth passage with the ninth passage in only one direction, the second one-way valve is located in the twelfth passage and communicates the eighth passage with the twelfth passage in only one direction, the third one-way valve is located in the thirteenth passage and communicates the thirteenth passage with the twelfth passage in only one direction.

8. The fluid control assembly according to claim 7, wherein the tenth passage comprises a first passage segment, and the eleventh passage comprises a second passage segment, wherein the second passage segment is formed around the first passage segment, a shape of first passage segment is the same with that of the second passage segment or tends to be the same, the first passage segment is arranged close to the second passage segment, and a working fluid in the first passage segment is able to heat exchange with a working fluid in the second passage segment.

9. The fluid control assembly according to claim 8, wherein the flow passage plate further comprises a first groove, which is arranged to extend through the flow passage plate, the third passage and the fourth passage are located at a side of the first groove, and at least part of the fifth passage and at least part of the ninth passage are located at an opposite side of the first groove.

10. The fluid control assembly according to claim 7, wherein the fluid control assembly has an interface, and the fluid control assembly is joint and in communication with other components in the thermal management system through the interface, the interface comprises a first interface, a second interface, a third interface, a fourth interface, a fifth interface, a sixth interface, a seventh interface, an eighth interface, a ninth interface, a tenth interface, an eleventh interface and a twelfth interface, wherein the first interface is formed as a part of the first passage, the second interface is in communication with the third passage, the third interface is in communication with the fourth passage, the fourth interface is in communication with the fifth passage, the fifth interface is in communication with the ninth passage, the sixth interface is in communication with the sixth passage, the seventh interface is in communication with the eighth passage, the eighth interface is in communication with the tenth passage, the ninth interface is in communication with the eleventh passage, the tenth interface is in communication with the thirteenth passage, the eleventh interface is in communication with the twelfth passage, and the twelfth interface is in communication with the seventh passage.

11. The fluid control assembly according to claim 10, wherein the first valve component is configured to throttlingly communicate or directly communicate the first interface with the second interface, the second valve component is configured to throttlingly communicate or directly communicate the first interface with the third interface, the third valve component is configured to throttlingly communicate or directly communicate the third interface with the fourth interface, which is in communication with the fifth interface, the fourth valve component is configured to throttlingly communicate the twelfth interface with the sixth interface, and the fifth valve component is configured to throttlingly communicate the twelfth interface with the sixth interface, wherein the first one-way valve is configured to communicates the eighth interface with the fifth interface in only one direction, the second one-way valve is configured to communicate the seventh interface with the eleventh interface in only one direction, and the third one-way valve is configured to communicate the tenth interface with the eleventh interface in only one direction.

12. The fluid control assembly according to claim 11, comprising but not limited to following two operation modes:

in a first operation mode, the first valve component, the third valve component and the fifth valve component are closed, and the second valve component and the fourth valve component are opened, wherein the second valve component directly communicates the first interface with the third interface, and the fourth valve component throttlingly communicates the twelfth interface with the sixth interface, in a second operation mode: the first valve component, the third valve component, the fourth valve component and the fifth valve component are open, and the second valve component is closed, wherein the first valve component directly communicates the first interface with the second interface, the third valve component directly communicates the third interface with the fifth interface, the fourth valve component throttlingly communicates the twelfth interface with the sixth interface, and the fifth valve component throttlingly communicates the twelve interface with the seventh interface.

13. A thermal management system, comprising a compressor, a liquid reservoir, an outdoor heat exchanger, a condenser, an evaporator, an expansion valve and a heat exchange component, wherein the thermal management system further comprises the fluid control assembly with interfaces, the fluid control assembly is joint and in communication with the compressor, the liquid reservoir, the condenser, the evaporator, the expansion valve and the heat exchange component through the interfaces, respectively, and the fluid control assembly is the fluid control assembly according to claim 1.

14. The thermal management system according to claim 13, wherein the interfaces comprise a first interface, a second interface, a third interface, a fourth interface, a fifth interface, a sixth interface, a seventh interface, an eighth interface, a ninth interface, a tenth interface, an eleventh interface and a twelfth interface, an outlet of the compressor is joint and in communication with the first interface, and an inlet of the compressor is joint and in communication with the fifth interface, an inlet of the liquid reservoir is joint and in communication with the eleventh interface, and an outlet of the liquid reservoir is joint and in communication with the twelfth interface, one port of the outdoor heat exchanger is joint and in communication with the third interface, and the other port of the outdoor heat exchanger is joint and in communication with the seventh interface, an inlet of the condenser is joint and in communication with the second interface, and an outlet of the condenser is joint and in communication with the tenth interface, an outlet of the evaporator is joint and in communication with the eighth interface, and an inlet of the evaporator is joint and in communication with the ninth interface through the expansion valve, an inlet of the first flow passage of the heat exchange component is joint and in communication with the sixth interface, and an outlet of the first flow passage is joint and in communication with the fourth interface.

* * * * *